UNITED STATES PATENT OFFICE.

WILLIAM HARROLD SMITH, OF CHICAGO, ILLINOIS.

ART OF PREPARING WASTE VEGETABLE PRODUCTS FOR USE AND TRANSPORTATION.

SPECIFICATION forming part of Letters Patent No. 233,885, dated November 2, 1880.

Application filed August 2, 1880. (No specimens.)

*To all whom it may concern:*

Be it known that I, WILLIAM HARROLD SMITH, of Chicago, in the county of Cook and State of Illinois, have invented certain new and useful Improvements in the Art of Preparing Waste Vegetable Products for Use and for Transportation; and I do hereby declare that the following is a full, clear, and exact description of my invention, which will enable others skilled in the art to which it appertains to make and use the same.

Heretofore many materials, such as the bran of wheat and corn, ship-stuff, sawdust, and many other waste products of a granular or fibrous character, have been little utilized, owing to their bulky nature, and the consequent difficulty and cost of transporting them to any great distance. Besides the increased cost of transportation due to their extreme bulky nature, great inconvenience has heretofore been experienced, also, in handling and using such articles where any attempt to utilize them at all has been made. Especially is this true of sawdust, which, owing to its finely-comminuted state, cannot even be used for fuel except in connection with other fuel, or in furnaces specially adapted for burning it; consequently heretofore little or none except local use has been made of it.

The object of my invention is to solidify or convert such loose and bulky material into homogeneous solid blocks of a suitable density, size, strength, and tenacity for convenience in handling for transportation, and for the uses for which the same may be adapted; and to this end my invention consists in first heating the loose material, in a dry state, in any suitable apparatus, to such a degree of heat as may be necessary to loosen or liquefy the natural resins, gums, and adhesive matters contained in the separate particles of material, and to soften and render plastic the fibers thereof, such heat varying usually from 150° to as high as 300° Fahrenheit, (the greater the heat, up to the burning-point, the greater solidity will result;) and then, second, subjecting the same, while still hot, to impact in molds.

By the application of heat the various resins and adhesive gums contained in the material to be solidified are liquefied and freed from their cells, and the fibers of the material are rendered soft and plastic, their natural elasticity being for the time destroyed, so that the loose mass is easily compacted into a very dense and solid block, and so that the same will retain the shape and form to which it is compressed.

By the subsequent impacting pressure to which the loose material is subjected while still hot, the adhesive matters loosened by the heat are evenly distributed throughout the whole mass, and the separate fibers interlocked, flattened, and arranged by the pressure are thus converted, united, and made to adhere together in one solid piece or block, which may be made of almost any degree of density, solidity, and tenacity desired.

In order to produce the best results the loose material to be solidified should be as nearly dry as possible, and the heat should be evenly distributed to every particle, as those portions which are not properly heated will not be softened so as to compact readily, and to cause the fibers to interlace and interlock with each other, and to free the adhesive matters from their cells to cement the fibers and cause them to adhere together. For this reason I have provided an apparatus for heating the material specially adapted to secure an even distribution of heat throughout the whole mass; but as I intend making the same, together with the means I employ for compressing the heated material, the subject-matter of a separate application for a patent, the same will not be here more fully described. Any well-known heating apparatus may, however, be used with good result.

Up to a certain point the finer the separate particles of the material the greater the strength, solidity, and tenacity will be of the product produced. For this reason, in the manufacture of artificial wood by my process from sawdust and other waste-wood products, when the same is designed to be used for other purposes than that of fuel, I select or use sawdust more finely comminuted than ordinary sawdust; or the ordinary sawdust can be first triturated. After the dry material has thus been taken and thoroughly heated it is next, while still hot, placed in molds and compressed by being subjected to the blows of a powerful steam-hammer or other suitable means.

After being compressed in the mold, as above described, the solid block thus formed is next pushed or discharged from the mold, and is then ready for use or transportation.

Wheat or corn bran, or bran from other grains, ship-stuff, or any like material, after being formed into solid blocks, as above described, is in convenient form for transportation.

The blocks may be made of any desired size. There will be no danger of the material heating, and thus becoming spoiled, as the preliminary heating dries the meal or bran thoroughly. At the same time it develops the resinous, glutinous, or adhesive qualities of the same, so that the material is kiln-dried as well as solidified. The blocks of bran have such a degree of strength and tenacity, as well as firmness, that it is almost impossible to crack or break them apart; yet by adding a little water or like liquid the particles absorb the same, loosen, and swell, and very readily resume their original size and shape, and form a mash ready for use for feeding. Ordinary bran may be in this way readily compressed from eight to ten times, so as to be of greater density than ordinary coal. A small block or cake of the product, therefore, when immersed in a pail in enough water to form a mash, will very soon fill the pail upon disintegrating or going to pieces.

By my process a great variety of new and useful products can be formed from the various waste or little-utilized products of saw-mills, flouring-mills, and other such materials.

I do not in this application claim any of the new products of my above-described process, as I intend to reserve them for the subject-matter of separate applications.

I am aware that powdered horn has been welded and consolidated by pressure in a mold and heat; but this differs from my invention in these particulars: First, it is an animal substance rich in gluten, while mine are vegetable substances poor in resin. Second, it is necessary to the process that the powdered horn shall be placed in the mold and under pressure cold, and subsequently heated. It is necessary to my process that the vegetable matter shall be heated before being placed in the mold. Third, it has long been known that horn could be united by heat and pressure; but it has never been known heretofore that wood could be so united. Fourth, horn or hoof will unite when moderately heated under considerable pressure; but vegetable fiber will not so unite except under a comparatively high heat evenly distributed.

I am also aware that vegetable substances rich in oil, like linseed and cotton-seed, have been heated and subjected to pressure for the purpose of extracting the oil, and that the residual product is a hard compact mass; but that differs essentially from my invention in the same way that the uniting of particles of horn differs—viz., the materials are already provided with a superabundance of a binding material, and in effect it requires neither great heat nor great pressure to produce a solid mass. Sawdust and other analogous waste vegetable matters to be placed in a condition analogous to oil-cake would require a large admixture of oleaginous or resinous substance. It would then be on a par with many compositions of artificial woods for which Letters Patent have been granted. As an illustration of my meaning, I will say that the residual product of linseed-oil extraction by diffusion in benzine is a dry meal so poor in oil or gluten that it has never been compressed into a solid cake by any process except the one herein described.

What I claim, and desire to secure by Letters Patent, is—

The within-described process of condensing and solidifying loose fibrous or granulated vegetable material, consisting in first heating the same from 150° to 500° Fahrenheit, as set forth, and then subjecting it, in a dry state and while thus heated, to impact in molds, substantially as described.

WILLIAM HARROLD SMITH.

Witnesses:
  H. M. MUNDAY,
  EDMUND ADCOCK.